United States Patent
David et al.

(10) Patent No.: US 11,468,414 B1
(45) Date of Patent: Oct. 11, 2022

(54) SYSTEMS AND METHODS FOR ESTABLISHING A PULL PAYMENT RELATIONSHIP

(71) Applicant: Wells Fargo Bank, N.A., San Francisco, CA (US)

(72) Inventors: Daniel David, Charlotte, NC (US); Jonathan A. Hartsell, Mooresville, NC (US); Heath Kamp, Banner Elk, NC (US); Sarah W. Phelps, Annapolis, MD (US); Philip Sprague, Matthews, NC (US); Christina Zikeli, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 802 days.

(21) Appl. No.: 15/284,040

(22) Filed: Oct. 3, 2016

(51) Int. Cl.
G06Q 20/10 (2012.01)
G06Q 20/32 (2012.01)

(52) U.S. Cl.
CPC ......... G06Q 20/10 (2013.01); G06Q 20/3278 (2013.01)

(58) Field of Classification Search
None
See application file for complete search history.

(56) References Cited

U.S. PATENT DOCUMENTS

| | | | |
|---|---|---|---|
| 5,412,192 A | 5/1995 | Hoss | |
| 5,778,067 A | 7/1998 | Jones et al. | |
| 6,016,484 A | 1/2000 | Williams et al. | |
| 6,018,724 A | 1/2000 | Arent | |
| 6,865,547 B1 | 3/2005 | Brake et al. | |
| 6,873,974 B1 | 3/2005 | Schutzer | |
| 7,287,695 B2 | 10/2007 | Wankmueller | |
| 7,765,481 B2 | 7/2010 | Dixon et al. | |

(Continued)

FOREIGN PATENT DOCUMENTS

| | | |
|---|---|---|
| WO | WO-2011/113121 A1 | 9/2011 |
| WO | WO-2012/139003 A2 | 10/2012 |

(Continued)

OTHER PUBLICATIONS

Lehdonvirta et al., UbiPay: Minimizing Transaction Costs with Smart Mobile Payments, Proceedings of the 6th International Conference on Mobile Technology, Application & Systems, ACM, Jan. 2009, retrieved from the Internet at http://www.researchgate.net/profile/Tatsuo_Nakajima/publication/220982951_UbiPay_minimizing_transaction_costs_with_smart_mobile_payments/links/548e9dad0cf225bf66a607bb.pdf on Oct. 30, 2015, 8 pages.

(Continued)

*Primary Examiner* — Jason Borlinghaus
(74) *Attorney, Agent, or Firm* — Foley & Lardner LLP (57) ABSTRACT

Systems, methods, and apparatuses for establishing a pull payment relationship are disclosed herein. A method performed by a financial institution computing system includes registering a payee for a pull payment service; registering a payor for the pull payment service; receiving an indication of a contact or a near contact event occurring between a user device associated with the payee and a user device associated with the payor; establishing a pull payment relationship between the payee and the payor responsive to receiving the indication; and fulfilling a payment request from the payee based on the established pull payment relationship.

15 Claims, 3 Drawing Sheets

(56) References Cited

U.S. PATENT DOCUMENTS

| | | |
|---|---|---|
| 7,822,206 B2 | 10/2010 | Birk et al. |
| 7,827,057 B1 | 11/2010 | Walker et al. |
| 7,909,243 B2 | 3/2011 | Merkow et al. |
| 7,930,225 B2 | 4/2011 | Wahlberg et al. |
| 7,970,669 B1 | 6/2011 | Santos |
| 8,019,365 B2 | 9/2011 | Fisher |
| 8,078,140 B2 | 12/2011 | Baker et al. |
| 8,126,806 B1 | 2/2012 | Dimartino et al. |
| 8,160,959 B2 | 4/2012 | Rackley et al. |
| 8,215,560 B2 | 7/2012 | Granucci et al. |
| 8,280,788 B2 | 10/2012 | Perlman |
| 8,332,290 B1 | 12/2012 | Venturo et al. |
| 8,401,904 B1 | 3/2013 | Simakov et al. |
| 8,433,657 B2 | 4/2013 | Dinan |
| 8,452,257 B2 | 5/2013 | Granucci et al. |
| 8,467,766 B2 | 6/2013 | Rackley et al. |
| 8,468,587 B2 | 6/2013 | Blinn et al. |
| 8,489,067 B2 | 7/2013 | Rackley, III et al. |
| 8,504,699 B2 | 8/2013 | Vaughan et al. |
| 8,533,123 B2 | 9/2013 | Hart |
| 8,538,845 B2 | 9/2013 | Liberty |
| 8,548,908 B2 | 10/2013 | Friedman |
| 8,548,926 B2 | 10/2013 | Balistierri et al. |
| 8,555,361 B2 | 10/2013 | Nakhjiri et al. |
| 8,566,237 B2 | 10/2013 | Forzley |
| 8,566,239 B2 | 10/2013 | Arthur et al. |
| 8,577,803 B2 | 11/2013 | Chatterjee et al. |
| 8,615,468 B2 | 12/2013 | Varadarajan |
| 8,627,424 B1 | 1/2014 | O'Malley et al. |
| 8,639,621 B1 | 1/2014 | Ellis et al. |
| 8,645,971 B2 | 2/2014 | Carlson et al. |
| 8,676,704 B2 | 3/2014 | Ledbetter et al. |
| 8,682,802 B1 | 3/2014 | Kannanari |
| 8,700,729 B2 | 4/2014 | Dua |
| 8,706,628 B2 | 4/2014 | Phillips |
| 8,725,576 B2 | 5/2014 | Fisher |
| 8,725,577 B2 | 5/2014 | Fisher |
| 8,732,080 B2 | 5/2014 | Karim |
| 8,744,966 B1 | 6/2014 | Amacker et al. |
| 8,750,901 B1 | 6/2014 | Gupta et al. |
| 8,768,830 B1 | 7/2014 | Jorgensen et al. |
| 8,768,834 B2 | 7/2014 | Zacarias et al. |
| 8,774,781 B1 | 7/2014 | Speiser et al. |
| 8,781,955 B2 | 7/2014 | Schamer et al. |
| 8,831,677 B2 | 9/2014 | Villa- |
| 8,838,501 B1 | 9/2014 | Priebatsch |
| 8,843,125 B2 | 9/2014 | Kwon et al. |
| 8,843,417 B2 | 9/2014 | Hammad |
| 8,880,432 B2 | 11/2014 | Collins, Jr. |
| 8,924,246 B1 | 12/2014 | Chen et al. |
| 8,925,805 B2 | 1/2015 | Grigg et al. |
| 8,972,297 B2 | 3/2015 | Kay et al. |
| 8,977,251 B2 | 3/2015 | Grigg et al. |
| 8,989,712 B2 | 3/2015 | Wentker et al. |
| 9,020,836 B2 | 4/2015 | Fisher et al. |
| 9,026,460 B2 | 5/2015 | Grigg et al. |
| 9,027,109 B2 | 5/2015 | Wolberg-Stok et al. |
| 9,037,509 B1 | 5/2015 | Ellis et al. |
| 9,043,240 B2 | 5/2015 | Langus et al. |
| 9,043,605 B1 | 5/2015 | Machani |
| 9,098,190 B2 | 8/2015 | Zhou et al. |
| 9,177,307 B2 | 11/2015 | Ross et al. |
| 9,195,984 B1 | 11/2015 | Spector et al. |
| 9,208,488 B2 | 12/2015 | Liberty |
| 9,218,624 B2 | 12/2015 | Moghadam |
| 9,256,876 B2 | 2/2016 | Vasant Akole et al. |
| 9,286,606 B2 | 3/2016 | Diamond |
| 9,317,849 B2 | 4/2016 | Pitroda et al. |
| 9,324,068 B2 | 4/2016 | Soundararajan |
| 9,361,616 B2 | 6/2016 | Zhou et al. |
| 9,691,058 B2 | 6/2017 | Epler et al. |
| 9,741,051 B2 | 8/2017 | Carpenter et al. |
| 9,805,363 B1 | 10/2017 | Rudnick et al. |
| 10,115,112 B2 | 10/2018 | Fordyce, III |
| 10,121,129 B2 | 11/2018 | Kalgi |
| 10,140,615 B2 | 11/2018 | Carpenter et al. |
| 10,169,812 B1 | 1/2019 | Bajgier et al. |
| 10,445,739 B1 | 10/2019 | Sahni et al. |
| 2002/0032602 A1 | 3/2002 | Lanzillo et al. |
| 2003/0028481 A1 | 2/2003 | Flitcroft et al. |
| 2003/0055785 A1 | 3/2003 | Lahiri |
| 2003/0056096 A1 | 3/2003 | Albert et al. |
| 2004/0230535 A1 | 11/2004 | Binder et al. |
| 2004/0236632 A1 | 11/2004 | Maritzen et al. |
| 2004/0254848 A1 | 12/2004 | Golan et al. |
| 2004/0260646 A1 | 12/2004 | Berardi et al. |
| 2005/0021401 A1 | 1/2005 | Postrel |
| 2005/0043997 A1 | 2/2005 | Sahota et al. |
| 2005/0086492 A1 | 4/2005 | Nicodemus et al. |
| 2005/0133590 A1 | 6/2005 | Rettenmyer et al. |
| 2005/0138377 A1 | 6/2005 | First et al. |
| 2005/0184145 A1 | 8/2005 | Law et al. |
| 2005/0235363 A1 | 10/2005 | Hibbard et al. |
| 2006/0253335 A1 | 11/2006 | Keena et al. |
| 2007/0168354 A1 | 7/2007 | Ramer et al. |
| 2007/0174873 A1 | 7/2007 | Griggs |
| 2007/0198432 A1 | 8/2007 | Pitroda |
| 2007/0199061 A1 | 8/2007 | Byres et al. |
| 2007/0244811 A1 | 10/2007 | Tumminaro |
| 2008/0005006 A1 | 1/2008 | Tritt et al. |
| 2008/0006685 A1 | 1/2008 | Rackley, III et al. |
| 2008/0033878 A1 | 2/2008 | Krikorian et al. |
| 2008/0040265 A1 | 2/2008 | Rackley, III et al. |
| 2008/0127317 A1 | 5/2008 | Nakhjiri |
| 2008/0208742 A1 | 8/2008 | Arthur et al. |
| 2008/0242274 A1 | 10/2008 | Swanburg et al. |
| 2008/0243701 A1 | 10/2008 | Von Mueller |
| 2008/0294556 A1 | 11/2008 | Anderson |
| 2008/0319887 A1 | 12/2008 | Pizzi et al. |
| 2009/0048971 A1 | 2/2009 | Hathaway et al. |
| 2009/0106558 A1 | 4/2009 | Delgrosso et al. |
| 2009/0157531 A1 | 6/2009 | Bui |
| 2009/0177563 A1 | 7/2009 | Bernstein et al. |
| 2009/0228384 A1 | 9/2009 | Melik-Aslanian et al. |
| 2009/0228966 A1 | 9/2009 | Parfene et al. |
| 2009/0271287 A1 | 10/2009 | Halpern |
| 2009/0319427 A1 | 12/2009 | Gardner et al. |
| 2009/0327151 A1 | 12/2009 | Carlson et al. |
| 2010/0057553 A1 | 3/2010 | Ameiss et al. |
| 2010/0082481 A1 | 4/2010 | Lin et al. |
| 2010/0114731 A1 | 5/2010 | Kingston et al. |
| 2010/0114733 A1 | 5/2010 | Collas et al. |
| 2010/0125495 A1 | 5/2010 | Smith et al. |
| 2010/0191602 A1 | 7/2010 | Mikkelsen et al. |
| 2010/0205077 A1 | 8/2010 | Hammad |
| 2010/0274655 A1 | 10/2010 | Postrel |
| 2010/0280896 A1 | 11/2010 | Postrel |
| 2011/0055080 A1 | 3/2011 | Ahlers et al. |
| 2011/0106674 A1 | 5/2011 | Perlman |
| 2011/0145149 A1 | 6/2011 | Valdes et al. |
| 2011/0153498 A1 | 6/2011 | Makhotin et al. |
| 2011/0154466 A1 | 6/2011 | Harper et al. |
| 2011/0191160 A1 | 8/2011 | Blackhurst et al. |
| 2011/0196782 A1 | 8/2011 | Allen et al. |
| 2011/0251892 A1 | 10/2011 | Laracey |
| 2011/0270748 A1 | 11/2011 | Graham et al. |
| 2011/0289004 A1 | 11/2011 | Prakash et al. |
| 2011/0295748 A1 | 12/2011 | Woodriffe |
| 2011/0302084 A1 | 12/2011 | Melik-Aslanian et al. |
| 2011/0313918 A1 | 12/2011 | Lawson et al. |
| 2012/0011063 A1 | 1/2012 | Killian et al. |
| 2012/0018511 A1 | 1/2012 | Hammad |
| 2012/0022944 A1 | 1/2012 | Volpi |
| 2012/0078735 A1 | 3/2012 | Bauer et al. |
| 2012/0078751 A1 | 3/2012 | Macphail et al. |
| 2012/0084210 A1 | 4/2012 | Farahmand |
| 2012/0110634 A1 | 5/2012 | Jakobsson |
| 2012/0130731 A1 | 5/2012 | Canetto |
| 2012/0143705 A1 | 6/2012 | Bhattacharya et al. |
| 2012/0150669 A1 | 6/2012 | Langley et al. |
| 2012/0150687 A1 | 6/2012 | Hart |
| 2012/0158589 A1 | 6/2012 | Katzin et al. |
| 2012/0185317 A1 | 7/2012 | Wong |
| 2012/0185387 A1 | 7/2012 | Doyle |

(56) References Cited

U.S. PATENT DOCUMENTS

| | | |
|---|---|---|
| 2012/0196586 A1 | 8/2012 | Grigg et al. |
| 2012/0197793 A1 | 8/2012 | Grigg et al. |
| 2012/0197794 A1 | 8/2012 | Grigg et al. |
| 2012/0209749 A1 | 8/2012 | Hammad et al. |
| 2012/0233005 A1 | 9/2012 | White |
| 2012/0239417 A1 | 9/2012 | Pourfallah et al. |
| 2012/0253852 A1 | 10/2012 | Pourfallah et al. |
| 2012/0253913 A1 | 10/2012 | Richard |
| 2012/0254021 A1 | 10/2012 | Wohied et al. |
| 2012/0271705 A1 | 10/2012 | Postrel |
| 2012/0284130 A1 | 11/2012 | Lewis et al. |
| 2012/0296720 A1 | 11/2012 | Pirillo |
| 2012/0303425 A1 | 11/2012 | Katzin et al. |
| 2012/0310774 A1 | 12/2012 | Chassin |
| 2012/0323717 A1 | 12/2012 | Kirsch |
| 2012/0323762 A1 | 12/2012 | Kapur et al. |
| 2012/0330837 A1 | 12/2012 | Persaud et al. |
| 2013/0006848 A1 | 1/2013 | Kuttuva |
| 2013/0013499 A1 | 1/2013 | Kalgi |
| 2013/0018777 A1 | 1/2013 | Klein |
| 2013/0018792 A1 | 1/2013 | Casey et al. |
| 2013/0030941 A1 | 1/2013 | Meredith et al. |
| 2013/0042261 A1 | 2/2013 | Tavormina et al. |
| 2013/0046697 A1 | 2/2013 | Schibuk |
| 2013/0054336 A1 | 2/2013 | Graylin |
| 2013/0054454 A1 | 2/2013 | Purves et al. |
| 2013/0060679 A1 | 3/2013 | Oskolkov et al. |
| 2013/0060696 A1 | 3/2013 | Martin et al. |
| 2013/0060708 A1* | 3/2013 | Oskolkov ............ G06Q 20/10 705/75 |
| 2013/0065555 A1 | 3/2013 | Baker et al. |
| 2013/0073365 A1 | 3/2013 | McCarthy |
| 2013/0073459 A1 | 3/2013 | Zacarias et al. |
| 2013/0080241 A1 | 3/2013 | Fisher |
| 2013/0110628 A1 | 5/2013 | Yeo et al. |
| 2013/0110658 A1 | 5/2013 | Lyman et al. |
| 2013/0132854 A1 | 5/2013 | Raleigh et al. |
| 2013/0144663 A1 | 6/2013 | Qawami et al. |
| 2013/0166332 A1 | 6/2013 | Hammad |
| 2013/0168450 A1 | 7/2013 | Von Mueller et al. |
| 2013/0173474 A1 | 7/2013 | Ranganathan et al. |
| 2013/0179352 A1 | 7/2013 | Dwyre et al. |
| 2013/0185167 A1 | 7/2013 | Mestre et al. |
| 2013/0191227 A1 | 7/2013 | Pasa et al. |
| 2013/0191277 A1 | 7/2013 | O'Leary et al. |
| 2013/0191278 A1 | 7/2013 | O'Leary et al. |
| 2013/0200999 A1 | 8/2013 | Spodak et al. |
| 2013/0204785 A1 | 8/2013 | Monk et al. |
| 2013/0226751 A1 | 8/2013 | Friedholm et al. |
| 2013/0226799 A1 | 8/2013 | Raj |
| 2013/0232032 A1 | 9/2013 | Chaturvedi et al. |
| 2013/0238455 A1 | 9/2013 | Laracey |
| 2013/0246260 A1 | 9/2013 | Barten et al. |
| 2013/0246261 A1 | 9/2013 | Purves et al. |
| 2013/0246265 A1 | 9/2013 | Al-Sahli |
| 2013/0254115 A1 | 9/2013 | Pasa et al. |
| 2013/0260734 A1 | 10/2013 | Jain et al. |
| 2013/0262309 A1 | 10/2013 | Gadotti |
| 2013/0262316 A1 | 10/2013 | Hruska |
| 2013/0262317 A1 | 10/2013 | Collinge et al. |
| 2013/0275250 A1 | 10/2013 | Rodell et al. |
| 2013/0290121 A1 | 10/2013 | Simakov et al. |
| 2013/0290169 A1 | 10/2013 | Bathula et al. |
| 2013/0297425 A1 | 11/2013 | Wallaja |
| 2013/0317928 A1 | 11/2013 | Laracey |
| 2013/0317984 A1 | 11/2013 | O'Leary et al. |
| 2014/0006129 A1 | 1/2014 | Heath |
| 2014/0006194 A1 | 1/2014 | Xie et al. |
| 2014/0006276 A1 | 1/2014 | Grigg et al. |
| 2014/0012750 A1 | 1/2014 | Kuhn et al. |
| 2014/0019352 A1 | 1/2014 | Shrivastava |
| 2014/0019360 A1 | 1/2014 | Yang |
| 2014/0038546 A1 | 2/2014 | Neal et al. |
| 2014/0040139 A1 | 2/2014 | Brudnicki et al. |
| 2014/0058855 A1 | 2/2014 | Hussein et al. |
| 2014/0074637 A1 | 3/2014 | Hammad |
| 2014/0074655 A1 | 3/2014 | Lim et al. |
| 2014/0074724 A1 | 3/2014 | Gordon et al. |
| 2014/0081783 A1 | 3/2014 | Paranjape et al. |
| 2014/0081854 A1 | 3/2014 | Sanchez et al. |
| 2014/0089171 A1 | 3/2014 | Gandhi |
| 2014/0100975 A1 | 4/2014 | Van |
| 2014/0101048 A1 | 4/2014 | Gardiner et al. |
| 2014/0108254 A1 | 4/2014 | Lee |
| 2014/0108263 A1 | 4/2014 | Ortiz et al. |
| 2014/0109200 A1 | 4/2014 | Tootill et al. |
| 2014/0114856 A1 | 4/2014 | Jung et al. |
| 2014/0118704 A1 | 5/2014 | Duelli et al. |
| 2014/0122310 A1 | 5/2014 | Torrens et al. |
| 2014/0129357 A1 | 5/2014 | Goodwin |
| 2014/0129442 A1 | 5/2014 | Hanson et al. |
| 2014/0136352 A1 | 5/2014 | Ramakrishna et al. |
| 2014/0180849 A1 | 6/2014 | Kimberg et al. |
| 2014/0188704 A1 | 7/2014 | Grossman et al. |
| 2014/0188718 A1 | 7/2014 | Grossman et al. |
| 2014/0188719 A1 | 7/2014 | Poornachandran et al. |
| 2014/0207680 A1 | 7/2014 | Rephlo |
| 2014/0214640 A1 | 7/2014 | Mallikarjunan et al. |
| 2014/0222670 A1 | 8/2014 | Concannon |
| 2014/0244506 A1 | 8/2014 | Gramling |
| 2014/0249948 A1 | 9/2014 | Graylin et al. |
| 2014/0250003 A1 | 9/2014 | Levchin et al. |
| 2014/0279097 A1 | 9/2014 | Alshobaki et al. |
| 2014/0279469 A1 | 9/2014 | Mendes |
| 2014/0279489 A1 | 9/2014 | Russell et al. |
| 2014/0279559 A1 | 9/2014 | Smith et al. |
| 2014/0279566 A1 | 9/2014 | Verma et al. |
| 2014/0297435 A1 | 10/2014 | Wong |
| 2014/0297520 A1 | 10/2014 | Levchin et al. |
| 2014/0297524 A1 | 10/2014 | Ravindranath et al. |
| 2014/0304095 A1 | 10/2014 | Fisher |
| 2014/0310182 A1 | 10/2014 | Cummins |
| 2014/0337175 A1 | 11/2014 | Katzin et al. |
| 2014/0351072 A1 | 11/2014 | Wieler et al. |
| 2014/0351126 A1 | 11/2014 | Priebatsch |
| 2014/0351130 A1 | 11/2014 | Cheek et al. |
| 2014/0365363 A1 | 12/2014 | Knudsen et al. |
| 2014/0376576 A1 | 12/2014 | Jespersen et al. |
| 2014/0379576 A1 | 12/2014 | Marx et al. |
| 2015/0019944 A1 | 1/2015 | Kalgi |
| 2015/0026049 A1 | 1/2015 | Theurer et al. |
| 2015/0032627 A1 | 1/2015 | Dill et al. |
| 2015/0039462 A1 | 2/2015 | Shastry et al. |
| 2015/0046241 A1 | 2/2015 | Salmon et al. |
| 2015/0046339 A1 | 2/2015 | Wong et al. |
| 2015/0074774 A1 | 3/2015 | Nema et al. |
| 2015/0088633 A1 | 3/2015 | Salmon et al. |
| 2015/0089568 A1 | 3/2015 | Sprague et al. |
| 2015/0095075 A1 | 4/2015 | Breuer et al. |
| 2015/0095219 A1 | 4/2015 | Hurley |
| 2015/0100442 A1 | 4/2015 | Van Heerden et al. |
| 2015/0100495 A1 | 4/2015 | Salama et al. |
| 2015/0112781 A1 | 4/2015 | Clark et al. |
| 2015/0140960 A1 | 5/2015 | Powell et al. |
| 2015/0154588 A1 | 6/2015 | Purves et al. |
| 2015/0178693 A1 | 6/2015 | Solis |
| 2015/0178725 A1 | 6/2015 | Poetsch |
| 2015/0186875 A1 | 7/2015 | Zhang et al. |
| 2015/0186886 A1 | 7/2015 | Schwalb et al. |
| 2015/0187021 A1 | 7/2015 | Moring et al. |
| 2015/0193869 A1 | 7/2015 | Del Vecchio et al. |
| 2015/0213435 A1 | 7/2015 | Douglas et al. |
| 2015/0220914 A1 | 8/2015 | Purves et al. |
| 2015/0229622 A1 | 8/2015 | Grigg et al. |
| 2015/0237026 A1 | 8/2015 | Kumar |
| 2015/0254698 A1 | 9/2015 | Bondesen et al. |
| 2015/0254699 A1 | 9/2015 | Bondesen et al. |
| 2015/0287015 A1 | 10/2015 | Kaplinger et al. |
| 2015/0324768 A1 | 11/2015 | Filter et al. |
| 2015/0332252 A1 | 11/2015 | Shahrokhi et al. |
| 2015/0339662 A1 | 11/2015 | Huang et al. |
| 2015/0348029 A1 | 12/2015 | Van Os et al. |
| 2015/0363810 A1 | 12/2015 | Kim et al. |
| 2015/0371326 A1 | 12/2015 | Montesano et al. |

(56) References Cited

U.S. PATENT DOCUMENTS

| | | |
|---|---|---|
| 2016/0004876 A1 | 1/2016 | Bye et al. |
| 2016/0012465 A1 | 1/2016 | Sharp |
| 2016/0026999 A1 | 1/2016 | Kurian |
| 2016/0042341 A1 | 2/2016 | Griffin et al. |
| 2016/0042344 A1 | 2/2016 | Thimmana et al. |
| 2016/0063496 A1 | 3/2016 | Royyuru et al. |
| 2016/0065370 A1 | 3/2016 | Le Saint et al. |
| 2016/0086170 A1 | 3/2016 | Hurt et al. |
| 2016/0086179 A1 | 3/2016 | Barbier |
| 2016/0092696 A1 | 3/2016 | Guglani et al. |
| 2016/0092866 A1 | 3/2016 | Liberty et al. |
| 2016/0092868 A1 | 3/2016 | Salama et al. |
| 2016/0092874 A1 | 3/2016 | O'Regan et al. |
| 2016/0125396 A1 | 5/2016 | Brickell et al. |
| 2016/0125409 A1 | 5/2016 | Meredith et al. |
| 2016/0125417 A1 | 5/2016 | Huang et al. |
| 2016/0132875 A1 | 5/2016 | Blanco et al. |
| 2016/0140555 A1 | 5/2016 | Scipioni |
| 2016/0162889 A1 | 6/2016 | Badenhorst |
| 2016/0342962 A1 | 11/2016 | Brown et al. |
| 2016/0342992 A1 | 11/2016 | Lee |
| 2016/0379215 A1 | 12/2016 | Clerkin |
| 2017/0017958 A1* | 1/2017 | Scott ............... G06Q 20/36 |
| 2017/0061402 A1 | 3/2017 | Mobin et al. |
| 2017/0061406 A1 | 3/2017 | Adams et al. |
| 2017/0193468 A1 | 7/2017 | Chougule et al. |
| 2017/0228715 A1 | 8/2017 | Gurunathan |
| 2018/0007052 A1 | 1/2018 | Quentin |
| 2018/0047016 A1 | 2/2018 | Sarin |
| 2018/0068308 A1 | 3/2018 | Gupta et al. |
| 2018/0082283 A1 | 3/2018 | Sharma |
| 2018/0157336 A1 | 6/2018 | Harris et al. |
| 2018/0322488 A1 | 11/2018 | Arana et al. |
| 2018/0365675 A1 | 12/2018 | Sivaraman |
| 2018/0374076 A1 | 12/2018 | Wheeler |
| 2019/0304029 A1 | 10/2019 | Murray et al. |

FOREIGN PATENT DOCUMENTS

| | | |
|---|---|---|
| WO | WO-2013/079793 A1 | 6/2013 |
| WO | WO-2014/012138 A1 | 1/2014 |
| WO | WO-2014/111888 A1 | 7/2014 |
| WO | WO-2014/207615 A1 | 12/2014 |
| WO | WO-2015/016780 A1 | 2/2015 |
| WO | WO-2015/023172 A2 | 2/2015 |
| WO | WO-2016/009198 A1 | 1/2016 |
| WO | WO-2016/053975 A1 | 4/2016 |
| WO | WO-2016/097879 A1 | 6/2016 |
| WO | WO-2016/172107 A1 | 10/2016 |
| WO | WO-2016/196054 A1 | 12/2016 |

OTHER PUBLICATIONS

"Cashcloud Mobile eWallet", FinTech Forum Exchange, Jul. 1, 2016. 4 pages.

"Cashcloud mobile eWallet", Popote Payments, www.popotepayments. com, 2016. 6 pages.

A Smart Card Alliance Payments Council White Paper; Publication date: Sep. 2011; Publication No. PC-11002; 191 Clarksville Rd. Princeton Junction, NJ 08550 www.smartcardalliance.org (Year: 2011).

How to Control Children's Spending on Debit Cards | Money | by Jill Paperworth, May 10, 2009, https:www.theguardian.com/money/2009/mar/.../children-debit-cards-online-spend . . . (Year: 2009).

Smart Card Alliance, "The Mobile Payments and NFC Landscape: A U.S. Perspective," Sep. 2011. 53 pages.

White, Ron, "How Computers Work", Que Publishing, 7th Ed, Oct. 15, 2003, p. 4. 23 pages.

EMV, "Payment Tokenisation Specification Technical Framework", 2014 EMVCO, LLC. 84 pages.

Ron White, How Computers Work, Oct. 15, 2003, Que, 7th Edition, p. 4. (Year: 2003).

The University of Alaska staff, Managing Finance Reports with Vista Plus, Aug. 2008, The University of Alaska, web, 2-20 (Year: 2008).

Kyrillidis, Mayes, Markantonakis; Card-present Transactions On The Internet Using The Smart CardWeb Server; 2013, IEEE; 12th (Year: 2013).

N. C. Kiran and G. N. Kumar, "Reliable OSPM schema for secure transaction using mobile agent in micropayment system," 2013 Fourth International Conference on Computing, Communications and Networking Technologies (ICCCNT), 2013, pp. 1-6, doi: 10.1109/ICCCNT.2013,6726503. (Year: 2013).

P. De, K. Dey, V. Mankar and S. Mukherjea, "Towards an interoperable mobile wallet service," 2013 10th International Conference and Expo on Emerging Technologies fora Smarter World (CEWIT), 2013, pp. 1-6, doi: 1109/CEWIT.2013.6713767. (Year: 2013).

W. Adi, A. Al-Qayedi, A. A. Zarooni and A. Mabrouk, "Secured multi-identity mobile infrastructure and offline mobile-assisted micropayment application," 2004 IEEE Wireless Communications and Networking Conference (IEEE Cat. No. 04TH8733), 2004, pp. 879-882 vol.2, doi: 10.1109/WCNC.2004.1311302. (Year: 2004).

Yang, Ming-Hour. "Security enhanced EMV-based mobile payment protocol." TheScientificWorldJournal vol. 2014 (2014): 864571. Doi: 10.115/2014/864571 (Year: 2014).

* cited by examiner

SYSTEMS AND METHODS FOR ESTABLISHING A PULL PAYMENT RELATIONSHIP

TECHNICAL FIELD

Embodiments of the present disclosure relate generally to the field of payments. More particularly, the systems, methods, and apparatuses relate to establishing a pull payment relationship between a payor and a payee.

BACKGROUND

There are many situations in which a person or an entity may want to request money from another person or entity, for example, when the person/entity is hired by the other person/entity to perform certain jobs such as a babysitting service, a cleaning service, a landscaping service, etc. Typically, the party performing the service or providing the goods asks the hiring party for payment upon completion of the service or providing of the goods. The party performing the service or providing the goods may accept only cash, while the hiring party may only or substantially only utilize payment cards. As a result, payments may be delayed and frustration may ensue. As such, a secure and convenient process is desired to facilitate fast and straightforward payments in these situations.

SUMMARY

A first exemplary embodiment relates to a method. The method includes registering, by a financial institution computing system, a payee for a pull payment service; registering, by the financial institution computing system, a payor for the pull payment service; receiving, by the financial institution, an indication of a contact or a near contact event occurring between a user device associated with the payee and a user device associated with the payor; establishing, by the financial institution computing system, a pull payment relationship between the payee and the payor responsive to receiving the indication; and fulfilling, by the financial institution computing system, a payment request from the payee based on the established pull payment relationship.

Another exemplary embodiment relates to a computing system associated with a financial institution. The computing system comprises a pull payment repository structured to store information relating to a pull payment service provided by the financial institution, and a processor communicably coupled to the pull payment repository. The processor is structured to register a payee for the pull payment service; register a payor for the pull payment service; receive an indication of a contact or a near contact event occurring between a user device associated with the payee and a user device associated with the payor; establish a pull payment relationship between the payee and the payor responsive to receiving the indication; and fulfill a payment request from the payee based on the established pull payment relationship.

A further exemplary embodiment relates to a non-transitory computer-readable media having computer-executable instructions embodied therein, when executed by a processor of a financial institution computing system, cause the financial institution computing system to perform a process. The process includes registering a payee for a pull payment service; registering a payor for the pull payment service; receiving an indication of a contact or a near contact event occurring between a user device associated with the payee and a user device associated with the payor; establishing a pull payment relationship between the payee and the payor responsive to receiving the indication; and fulfilling a payment request from the payee based on the established pull payment relationship.

Yet another exemplary embodiment relates to a method. The method comprises registering, by a first user device, for a pull payment service with a financial institution computing system; receiving, by the first user device, a first transaction code associated with the first user device from the financial institution computing system; receiving, by the first user device, a second transaction code associated with a second user device from the second user device; updating, by the first user device, the financial institution computing system with a pull payment relationship between the first transaction code and the second transaction code; and establishing, by the first user device, rules governing a payment between the first transaction code and the second transaction code.

These and other features, together with the organization and manner of operation thereof, will become apparent from the following detailed description when taken in conjunction with the accompanying drawings.

DETAILED DESCRIPTION

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Referring to the Figures generally, various systems, methods, and apparatuses relate to establishing a pull payment relationship between a payor and a payee. As used herein, a "payor" refers to an individual or entity that makes payments; a "payee" refers to an individual or entity that receives the payments. According to the present disclosure and in one embodiment, the payee and the payor can be registered with a financial institution (e.g., a bank) for a pull payment service provided by the financial institution. However, in other embodiments, the payee and payor may be members of different financial institutions. In one implementation, a unique transaction code is created for the payee whereby the payee can associate one or more financial accounts with the unique transaction code for receiving the payments. Further, another unique transaction code may be created for the payor whereby the payor can associate one or more financial accounts with the unique transaction code for making the payments. As used herein, a transaction code refers to a code that identifies the payor or payee in the pull payment transaction service. In some embodiments, the code may include letters, numbers, symbols, or any combination thereof. In further embodiments, the code may be tokenized. As used herein, "tokenization" refers to creating tokens that identify the transaction codes (e.g., a proxy or other representation that may be used to replace a sensitive data value with a non-sensitive or less sensitive data value).

According to the present disclosure, a pull payment relationship can be established by a contact or near contact event occurring between a user device (e.g., a smartphone) associated with the payee and a user device associated with the payor. As used herein, "a contact or a near contact event" refers to an event of bringing user devices close enough to each other so that information can be communicated between the user devices. In this regard, the "contact or near contact even" may be characterized by a close or relatively close proximity between the two devices. Thus, in one embodiment, "contact or near contact events" refer to Bluetooth, near field communication (NFC), an infrared interface, and/or any other type of short-range communication method. However, in other embodiments, a relatively broader range communication protocol may be used, such as the Internet or a WI-FI network. In either configuration, in use, after the contact or near contact event, a pull payment relationship may be established between the payor and payee.

According to one embodiment, the payor can establish rules governing the payments, which specify the amount, limit, time/date, and/or frequency of the payments, whether an approval by the payor or a third party is required before making the payments, whether a clawback mechanism is desired for the payments, etc. The payor and payee are able to transfer funds once the relationship is established. In particular, the payee requests the financial institution to transfer funds from the payor and provides the financial institution with the transaction codes for both the payee and the payor, requested amount and/or time/date for the payment. The financial institution determines whether the requested payment conforms to the established rules. Non-conforming requests may be declined; conforming requests may be awarded (i.e., allowed to be processed such that money is exchanged). If the rules specify that an approval by the payor or the third party is required, the financial institution may pass or transmit the payment request to the payor or the third party for approval before awarding the request.

As an example, a person hires a contractor to perform a landscaping service, which is broken down into various stages (e.g., create flower beds, add bushes, add mulch, etc.). The contractor asks the hiring person for payment upon completion of each stage of the service. The hiring person and the contractor can both register with a bank for the pull payment service by opening a pull payment webpage or run a pull payment application provided by the bank using smartphones. Subsequently, the hiring person "taps" his/her smartphone to the contractor's smartphone so that a pull payment relationship is established (i.e., the contact or near contact event). Thereafter, payment can be made to the contractor upon the contractor's request input via the pull payment webpage or the pull payment application. Therefore and beneficially, the contractor need not wait for the hiring party to write a check or obtain cash to pay the contractor, the contractor and hiring party can be located remotely (i.e., in different geographic locations), and payments can be achieved relatively faster. Such a service may be advantageous in situations as described above that typically require planning on the part of the hiring party and/or contractor in order to enable the payment to occur (e.g., the contract may need to tell the hiring party to pay them today whereby the hiring party must stop at an ATM or other place to acquire the funds, which is inconvenient).

As used herein, the term "pull payment relationship" refers to the payee being able to pull a payment. For example, the payee may obtain or facilitate obtaining a payment for a good or service by initiating the payment transaction with the payor. More particularly, a pull payment refers to the payee taking or facilitating taking a payment with (or, in some instances, without) the consent of the payor, wherein the payment is initiated by the payee and a pull payment service refers to a service provided by the financial institution (or a third party in some embodiments) to facilitate pull payment transactions. In comparison, a "push payment relationship" refers to a payment relationship where the payor pushes the payment to the payee. For example, when a payor is at a convenient store, the payor may provide cash to an attendant to pay for a good; in this regard, the payor has pushed the payment to the payee/attendant of the convenient store.

Beneficially, the systems, methods, and apparatuses of the present disclosure provides a secure and convenient process to facilitate fast and straightforward payments in peer-to-peer transactions. These and other features and benefits of the present disclosure are described more fully herein below.

Figure 1:
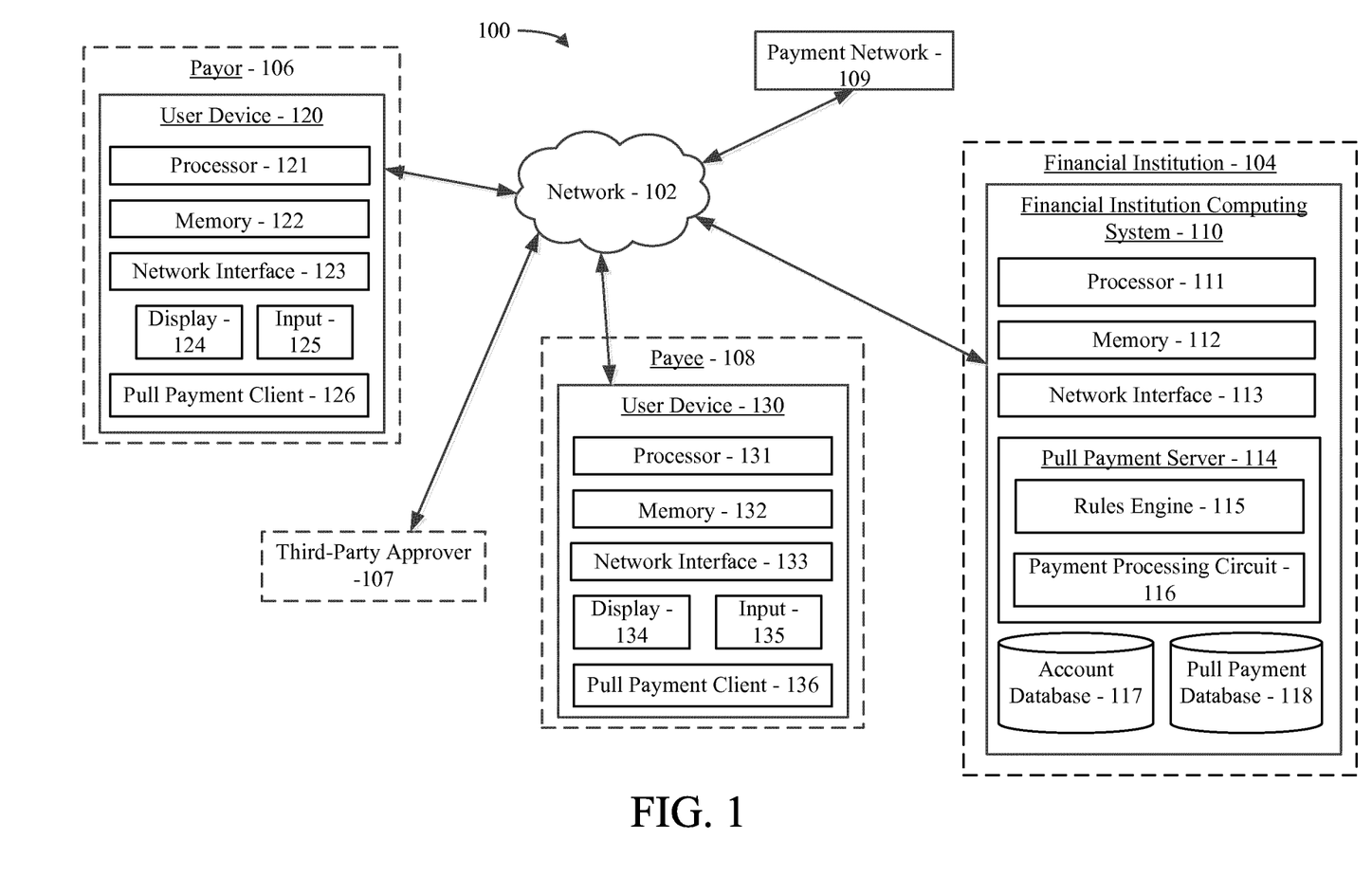
FIG. 1 is a schematic diagram of a computing environment for establishing a pull payment relationship, according to an example embodiment.

Referring now to FIG. 1, a schematic diagram of a computing environment 100 (also referred to herein as a computing system) for establishing a pull payment relationship is shown according to an example embodiment. As shown, the computing environment 100 includes a financial institution computing system 110 associated with a financial institution 104, a payor 106 associated with a user device 120, a payee 108 associated with a user device 130, a third-party approver 107, and payment network 109; all of which are communicably coupled over a network 102. In operation, the financial institution 104 facilitates establishment of a payor 106 and a payee 108 pull payment relationship. Upon an establishment, the financial institution 104 can further facilitate, enable, or otherwise allow the payor 106 to make a payment and the payee 108 to receive the payment through the payment network 109. When third-party approval is required, the financial institution 104 may obtain the approval from the third-party approver 107.

As shown, the financial institution 104 operates a financial institution computing system 110 that hosts or includes a pull payment server 114 for providing pull payment services. The financial institution computing system 110 includes a processor 111, memory 112, and a network interface 113. Memory 112 stores various instructions that, when executed by the processor 111, control the operation of the financial institution computing system 110. The network interface 113 allows the financial institution computing system 110 to send and receive data to and from external devices and entities via the network 102. The financial institution 104 may provide pull payment services via the pull payment server 114 on the financial institution computing system 110 and pull payment clients on a user device 120 of the payor 106 and a user device 130 of the payee 108. The pull payment server 114 includes instructions executable by the processor 111 to implement at least some or all of the pull payment functions described herein. The pull payment server 114 includes a rules engine 115 structured to establish and manage rules governing the pull payment relationship between the payor 106 and the payee 108, and a payment processing circuit 116 structured to process funds transfers from the payor 106 to the payee 108. The funds transfers may include transactions in connection with an account(s) of account holders (e.g., the payor 106 and the payee 108), such as account credits and debits to checking and savings accounts, credits and debits to credit/debit card accounts, credits and debits to gift accounts, and so on.

As also shown, the financial institution computing system 110 includes various databases, for example, an account database 117 and a pull payment database 118. The account database 117 may hold, store, categorize, and otherwise serve as a repository of account information for the customers of the financial institution 104. The account information includes user authentication information (e.g., account numbers, username/password combinations, device authentication tokens, security question answers, etc.), various statements (e.g., credit/debit statements for the accounts), etc. The pull payment database 118 may hold, store, categorize, and otherwise serve as a repository of pull payment information for the pull payment service users, such as the payor 106 and payee 108. The pull payment information includes user authentication information (e.g., codes, password, device authentication tokens, etc.), rules governing the pull payment relationship, transaction history (e.g., statements for funds transfer from the payor 106 to the payee 108), etc. Whenever funds are transferred into an account of the payee 108 or out of an account of the payor 106, the payment processing circuit 116 communicates the debit or credit to the pull payment database 116 to reflect an appropriate debit or credit in the pull payment database 116.

The funds transfer between the payor 106 and the payee 108 may be an intrabank transfer (i.e., transfers in which the payor 106 and the payee 108 both have accounts at the same bank and the funds are transferred between the accounts within the same bank). In another embodiment, the funds transfer between the payor 106 and the payee 108 may be an interbank transfer (i.e., a transfer in which the payor 106 and the payee 108 have accounts at different banks and the funds are transferred between the accounts at different banks). In this regard, the payor 106 and payee 108 may have or not have financial accounts with the financial institution 104. All such variations are intended to fall within the scope of the present disclosure.

The payor 106 and the payee 108 may be individuals or business entities. The payor 106 and the payee 108 may utilize the user devices 120 and 130, respectively, to access the pull payment services provided by the financial institution 104, among other means. The user device 120 may be a smartphone, a portable media device, a personal digital assistant (PDA), a laptop computer, or a personal computer. The user device 102 includes a processor 121, memory 122, and a network interface 123. Memory 122 stores various instructions that, when executed by the processor 121, control the operation of the user device 120. The network interface 123 allows the user device 120 to send and receive data to and from external devices and entities via the network 102. The network interface 123 may be a wireless network interface that communicates with a wireless communication protocol (e.g., 802.11a/b/g/n, Bluetooth®, Zigbee®, CDMA, GSM, LTE, WiMax, etc.) or a wired communication protocol (e.g., Ethernet, USB, Thunderbolt®, etc.). In some embodiments, the network interface 123 may further include an infrared interface for transmitting and receiving signals with infrared light. In some embodiments, the network interface 123 may further include a near field communication (NFC) interface that communicates with an NFC protocol (e.g., ISO 18092, ISO 21521, etc.).

The user device 120 includes a display 124 and an input 125. In some arrangements, the display 124 and the input 125 are integrated in a touchscreen display. The pull payment client 126 includes instructions executable by the processor 121 to implement at least some or all of the pull payment functions described herein. The pull payment client 126 may be a web browser that is configured to receive and display web pages (e.g., web pages prompting the payor 106 to register for the pull payment service, web pages displaying funds transfer information, etc.) or an application executed by the user device 120. The pull payment client 126 is configured to communicate with pull payment server 114 on the financial institution computing system 110 via the network 102.

The user device 130 may include similar components as the user device 120, namely, a processor 131, memory 132, a network interface 133, a display 134, an input 135, and a pull payment client 136. In this regard, different reference numerals are utilized for clarity and to not indicate different structure or function of the aforementioned components. Accordingly, the aforementioned components in the user device 130 may have the same or similar structure and function as the same named or titled components in the user device 120.

In some arrangements, third-party approval is required before the pull payment is made. In this regard, third-party approval may serve as a check or other review mechanism prior to processing the payment to, in turn, prevent or substantially prevent any unwanted payments from occurring. There may be situations where the third-party approval is desired. For example, when a child pays for services/goods with funds in a parent's financial account, the parent might want to approve the payment. As another example, the payor 106 may engage a landscape contractor to work on a landscape project, and the payor 106 may wish to have a third-party inspector check how the work was performed before making the payment. The third-party approver 107 may be individuals or business entities. When the third-party approval is required, the financial institution 104 can reach out to the third-party approver 107 via the network 102 (e.g., e-mail, phone call, text message, voice message, etc.). In some arrangements, the third-party approver 107 can communicate with the financial institution computing system 110 through a user device (not illustrated in the present figure) like the user devices 120 and 130.

The financial institution 104 may settle the funds transfer using the payment network 109. In this regard, the payment network 109 is structured as the rail or channel for transferring the funds. Accordingly, the payment network 109 may include, but is not limited to, a real-time payment rail, a debit card rail, a wire rail, a mobile wallet payment rail, a credit card payment rail, and so on. The payment network 109 may include an organization (e.g., a financial institution) that guarantees or mostly guarantees the funds transfer between the payor 106 and the payee 108. The financial institution of the payment network 109 may be the same as or different than the financial institution 104 that provides the pull payment services. As used herein, an issuer refers to a financial institution (e.g., a bank) that creates and maintains financial accounts. In one embodiment, the financial institution 104, the issuer of the payor's financial account, and the issuer of the payee's financial account can be called "member banks" (or member financial institutions) of the payment network 109. That is, the member banks associated with the payment network 109 may follow established protocols for transferring funds using the payment network 109. To become "member banks," the banks may be required to register with the payment network 109. The payment network 109 is structured to facilitate payments or funds transfers between the banks. The payment network 109 may be operated or owned by a third party entity or a joint venture from the member banks in the pursuit of providing easy interbank fund transfers. In some arrangements, the payment network 109 is embodied as a computing system or server. The payment network 109 may confer with the financial institution computing system 110 prior to confirming the payment. The confirmation may include, for example verifying that the payor's account associated with the pull payment is active and has enough remaining credit to proceed with the transaction. The payment confirmation either indicates that the payment source is accepted and that the transaction is approved or that the payment is denied.

The network 102 facilitates communication between the above-noted devices and entities. The network 102 may include private networks, public networks, or a combination thereof. In some arrangements, the network 102 includes the Internet. The network 102 may be any type of network. For example, the network 102 may be a wireless network interface (e.g., 802.11X, cellular network, satellite network, ZigBee, Bluetooth, Internet, etc.), a wired network interface (e.g., Ethernet, Fiber Optic, etc.), or any combination thereof.

Figure 2:
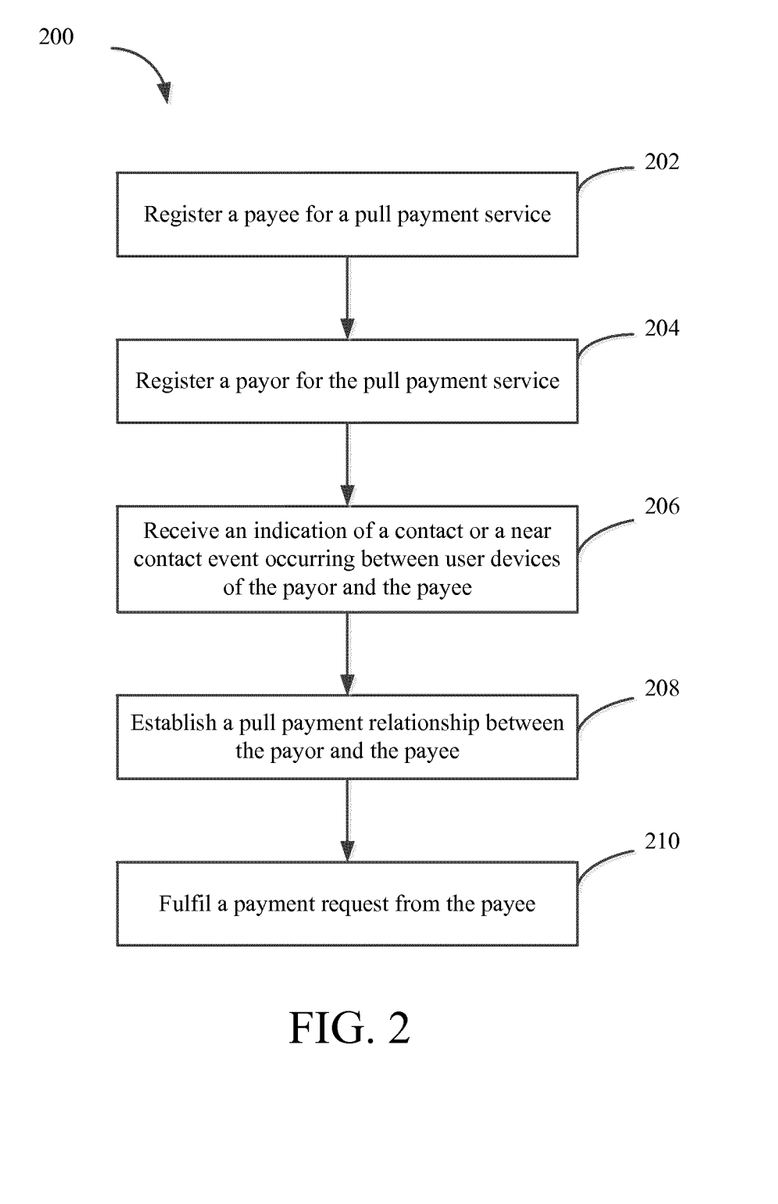
FIG. 2 is a flow diagram of a method for establishing a pull payment relationship, according to an example embodiment.

Referring to FIG. 2, a flow diagram of a method 200 of establishing a pull payment relationship is shown according to an example embodiment. In one embodiment, the method 200 can be performed by the financial institution computing system 110 (e.g., by the processor 111). Accordingly, reference may be made to FIG. 1 and the components thereof to aid explanation of method 200.

At process 202, the payee 108 is registered with the financial institution 104 for the pull payment services. The payee 108 may submit a registration request to the financial institution 104 in order to utilize the pull payment services to request and receive a payment. The registration request may include user identification information (e.g., a username, account number, date of birth, password information, etc.). The payee 108 may have or not have a financial account with the financial institution 104. If the payee 108 has a financial account with the financial institution 104, the financial institution computing system 110 can retrieve the payee's profile from the account database 117 based on the user identification information (assuming one exists). If a payee profile does not exist, the financial institution computing system 110 may prompt the payee to establish profile, which comprises the user information.

Multiple channels or methodologies are available to the payee 108 for registering for the pull payment services, such as on-site, online, by mail, by phone, etc. For example, the payee 108 can visit a branch office of the financial institution 104, provide user information/profile to a teller who enters the payee's request and information into the pull payment database 118 on the financial institution computing system 110. In some arrangements, the payee 108 fills a pull payment application form and sends the application to the financial institution 104 by mail; personnel of the financial institution 104 receive the payee's request; and, pull payment database 118 is updated with information provided in the application form. In some arrangements, the payee 108 can talk to call center personnel of the financial institution 104 and provide information needed to set up the pull payment service. In some arrangements, the payee 108 can register through the pull payment client 136 on the user device 130. In some arrangements, the pull payment client 136 is a web browser configured to receive and display web pages prompting the payor 106 to register for the pull payment service and input needed information. In some arrangements, the pull payment client 136 is an application executed by the user device 130. The pull payment client 136 may communicate with pull payment server 114 on the financial institution computing system 110 via the network 102. The pull payment database 118 stores the payee's information transferred by the pull payment client 136.

The financial institution computing system 110 may create a unique code (or token) for the payee 108 that identifies the payee 108 in pull payment transactions, which is called the "transaction code" for the payee. In some arrangements where the payee 108 registers via the user device 130, a device token can be generated, which is specific to the user device 130. The device token is used to register the user device 130 and to link the user device 130 with the payee 108. The device token can be used in lieu of or in addition to the transaction code in authentication and/or transactions through the financial institution computing system 110. In some arrangements, the payee 108 may also select a password that will allow the financial institution computing system 110 to ensure that only authorized users are requesting payments.

The payee 108 can define the method by which payments can be received by associating one or more financial accounts with the transaction code created for the payee 108. The one or more financial accounts may include a check account, a savings account, a credit card account, a debit card account, a pre-paid card account, a gift card account, or any other suitable financial account. The one or more financial accounts may be held by the financial institution 104 or held by a different financial institution relative to the financial institution 104. In some arrangements, the payee 108 may additionally or alternatively associate a digital wallet account with the pull payment services for receiving payments. The payment may be in the form of a deposit to the associated financial account. As used herein, a "deposit" can include an actual transfer of money to an account such as a debit card account, and/or may include a debit to an account such as a credit card account. In some arrangements where multiple financial accounts are associated with the transaction code, the payee 108 can specify under what situations should each account be used, and/or assign a priority value to each account. The priority value may establish a hierarchy of the accounts for receiving payments. The payee 108 may change the financial account(s) associated with the transaction code and/or the priority values of the accounts at any time. The payee 108 may provide the pull payment server 114 with information relating to the financial accounts, which may be stored in the pull payment database 118 and associated with the transaction code of the payee 108. The information may include, for example, account number, card number, expiration date, security code (credit) or PIN (debit), optional email address or phone number for confirmation/receipt.

In some arrangements, the payee 108 may desire a clawback mechanism. As used herein, the "clawback" refers to return of money already received. For example, the payee 108 is requesting funds from friends and relatives to sponsor a trip. If adequate funds are contributed by a designated date, the payee 108 will take the money and make the trip. Otherwise, the payee 108 may like to cancel the trip and return the contributed funds to the contributors. The clawback mechanism may be implemented by associating the payee's transaction code with a holding account at the financial institution 104. The funds contributed by the relatives and friends payors can be transferred first to a holding account. If adequate funds are contributed by the designated date, the funds will then be transferred to the payee's account. Otherwise, the funds will be transferred back to the relatives and friends payors' accounts. The financial institution 104 can maintain a holding account for all the temporarily transferred funds, therefore the payee 108 does not need to open an escrow account by itself.

The payee 108 can register as either a one-time user or a repeated user of the pull payment services. As used herein, a one-time user refers to the user who uses the pull payment service for one payment only whereas a repeated user refers to the user who uses the pull payment service repeatedly. The payee 108 can select from options provided when registering for the service. For example, the payee 108 can inform a bank teller of the selection, choose from options of "one-time user" and "repeated user" on the application form, or select from the options via the display 134 on the user device 130. In some arrangements where the payee 108 registers as a one-time user, the information provided for registration may be used for a single transaction. Once the transaction is complete and the funds have been received, the financial institution computing system 110 can remove all information regarding the transaction.

At process 204, the payor 106 is registered with the financial institution 104 for the pull payment service. In some arrangements, the payor's registration can be similar to the payee's registration. In particular, the payor 106 submits a registration request to the financial institution 104 and provides user identification information and optionally the payor's profile using any suitable means such as on-site, online, by mail, by phone, etc. The payor provides an email address and some basic information such as name and address to register online. The financial institution computing system 110 creates a unique code (or token) for the payor 106 that identifies the payor 106 in pull payment transactions, which is called the "transaction code" for the payor. In some arrangements where the payor 106 registers via the user device 120, a device token can be generated specific to the user device 120. The device token is used to register the user device 120 and to link the user device 120 with the payor 106. The payor 106 may also select a password that will allow the financial institution computing system 110 to ensure that only authorized users are making payments. The payor 106 can define the instrument(s) by which payments can be made by, associating one or more financial accounts with the transaction code created for the payor 106. The financial account(s) may be with or not with the financial institution 104. In some arrangements, the payor 106 may additionally or alternatively associate a digital or mobile wallet account with the pull payment services for making payments. The payment may be in the form of a credit to the associated financial account. In some arrangements where multiple financial accounts are associated with the transaction code, the payor 106 can specify under what situations each account should be used, and/or assign a priority to each account. The payor 106 may change the financial account(s) associated with the transaction code and/or the priorities of the accounts at any time. The payor 106 may provide the pull payment server 114 with information relating to the financial accounts, which will be stored in the pull payment database 118 and associated with the transaction code of the payor 106.

At process 206, the pull payment server 114 receives an indication of a contact or a near contract event occurring between the user device 120 associated with the payor 106 and the user device 130 associated with the payee 108. As mentioned above, a contact or a near contact event refers to an event of bringing user devices 120 and 130 close enough to each other so that information can be communicated between the user devices 120 and 130. When the payor 106 and the payee 108 both complete registration, transaction codes are generated for both and can be communicated to each other by, for example, "bumping" or "tapping" the user devices 120 and 130 associated with the payor 106 and payee 108, respectively. In this regard, the "bumping" or "tapping" refers to the contact or near contact event. The bumping or tapping may be a NFC tap or a Bluetooth tap, in one embodiment. In another embodiment, the user devices 120 and 130 each include an infrared interface for transmitting and receiving signals with infrared light. For example, the infrared interface may comply with an infrared IrDA protocol for data transmission. When brought close enough in the range available via the infrared interface, the user devices 120 and 130 can transmit the respective transaction codes to each other and/or receive the transaction code of the other via the infrared interface. The transaction code can be "tokenized" when being transmitted to the other party. Each token may be a string of characters (e.g., numbers, letters, symbols) such as email address, user identifier, device identifier, etc. that represents an encoded version of a transaction code. The tokenized transaction code can be retrieved from the token by decoding the token. The use of tokens instead of actual transaction code provides an added layer of data theft protection. Upon receiving the transaction code of the payee 108, the user device 120 of the payor 106 may notify the pull payment server 114 that a contact or a near contact event occurred between the user devices 120 and 130 of the payor 106 and the payee 108.

In one embodiment, the user devices 120 and 130 each include a near field communication (NFC) interface. The NFC interface may allow for close range communication at relatively low data rate and may comply with various NFC protocols (e.g., ISO 18092, ISO 21521, etc.). When brought close enough in the range available via the NFC interface, the user devices 120 and 130 can transmit the respective transaction codes to each other and/or receive the transaction code of the other via the NFC interface. The transaction code can be "tokenized" when being transmitted to the other party. Upon receiving the transaction code of the payee 108, the user device 120 of the payor 106 may notify the pull payment server 114 that a contact or a near contact event occurred between the user devices 120 and 130 of the payor 106 and the payee 108.

In another embodiment, the user devices 120 and 130 each include a Bluetooth network interface. The Bluetooth network interface may enable close range wireless connections within a bandwidth assigned for Bluetooth communications. When brought close enough in the range available via the Bluetooth network interface, the user devices 120 and 130 can transmit the respective transaction codes to each other and/or receive the transaction code of the other via the Bluetooth network interface. The transaction code can be "tokenized" when being transmitted to the other party. Upon receiving the transaction code of the payee 108, the user device 120 of the payor 106 may notify the pull payment server 114 that a contact or a near contact event is occurring between the user devices 120 and 130 of the payor 106 and the payee 108. In other arrangements, the user devices 120 and 130 may transmit the transaction code or token to each other through Wi-Fi network, ZigBee network, or any other type of network.

In still another embodiment, a transaction code or token may be associated with a matrix barcode. The user device 120 and/or 130 may display the matrix barcode on the display. The other user device may scan the matrix barcode and obtain the transaction code or token. In some arrangements, the payor 106 and the payee 108 can inform each other of the transaction codes through various processes such as exchanging emails, exchanging text messages, talking over the phone, etc. Upon receiving the transaction code of the payee 108, the user device 120 of the payor 106 may notify the pull payment server 114 that a contact or a near contact event is occurring between the user devices 120 and 130 of the payor 106 and the payee 108.

At process 208, the pull payment server 114 establishes a pull payment relationship between the payor 106 and the payee 108 responsive to receiving the indication of the contact or a near contact event. The pull payment relationship is identified by the payor's transaction code and the payee's transaction code. In some arrangements, the rules engine 115 may specify rules governing the pull payment relationship, e.g., rules governing the payments from the payor 106 to the payee 108. For example, the payor 106 can define the rules for the pull payment relationship between the payor 106 and the payee 108. As used herein, "rules" refer to a set of instructions that define conditions and/or boundaries regarding any payment made to the payee 108 by the payor 106. In some arrangements, the rules can specify the amount, limit, time/date, and/or frequency of any payment made to the payee 108 by the payor 106. Regarding the amount, the rules can provide the amount for each payment. For example, the amount of each payment might be the same for the same services (e.g., lawn care service) provided, which can be specified by the payor in the rules. Regarding the limit, the rules can provide the maximum amount for each payment, and/or the maximum amount paid in a period of time. For example, the rules may specify that a maximum of $1,000 can be paid to a nanny every month. Regarding the time/date, the rules can provide when a payment is to be made, and/or when the relationship is in effect. For example, the rules may specify that the payment is to be paid the last day of each month, and/or the relationship is in effect for six months, etc. Regarding the frequency, the rules can provide how often the payment is to be made. For example, the rules may specify the payment is to be made every week. The payor 106 can establish different combination of boundaries and conditions for pull payment relationship with different payees in terms of predefined payment amounts, predefined payment times/dates, predefined relationship durations, etc. For example, the payor can specify that a payment of $100 is made to a nanny at 5:00 PM every Friday for three consecutive months upon the nanny's requests. Or, the payor can specify that a maximum of $1,000 is paid to a landscape service contractor during two weeks upon the contractor's requests. It shall be understood that the rules can include any suitable boundaries/conditions regarding the payment relationship between the payor 106 and the payee 108. In further arrangements, the payor 106 and the payee 108 can agree on an interest rate for any late payment. The interest may be predefined by the rules engine and then implemented by the rules engine.

In some arrangements, the rules can specify whether an approval by the payor 106 or the third-party approver 107 is required before a payment is made. If the payor 106 waives the approval, a payment that conforms to the rules will be made to the payee 108 upon request without the payor's approval. If the approval is required, a payment that conforms to the rules will be made after the approval of the payor 106 or the third-party approver 107. In some arrangements, the rules can specify a combination of boundaries/conditions of the payment and the approval requirement. For example, the rules can provide that a payment of less than $25 (or another predefined threshold value) can be made without approval while an amount equal to or beyond $25 requires the approval. Or, the rules can provide that a total payment of less than $100 during a month can be made without approval, while the approval is required when the total payment in one month exceeds $100, and so on. It shall be understood that the rules can include any suitable combination of payment boundaries/conditions and the approval requirement.

In some arrangements, the payor 106 may desire a clawback mechanism in situations where the payor 106 would like to check whether the payee 108 did deliver the services/products and/or the quality of the services/products as claimed before making the payment. One example is where divorced parents share the child's spending. When a parent buys, for example, soccer cleats, for the child, he/she might want to pull half of the expense from the other parent's account. The other parent would like to see the receipts before paying. As another example, when the payor 106 engages a landscape contractor to work on a landscape project, the payor 106 may wish to check how the work is performed before paying (e.g., receive a photograph of progress to date). In the clawback mechanism, funds can be first transferred from the payor's account associated with the payor's transaction code to a holding account at the financial institution 104 upon the payee's request. If the request is eventually approved, the funds can then be transferred to the payee's account associated with the payee's transaction code. If the request is eventually declined, the funds can then be transferred back to the payor's account. The financial institution 104 can maintain a holding account for all the temporarily transferred funds, therefore the payor 106 does not need to open an escrow account by itself.

Regarding implementation of the clawback mechanism, either the payor 106 or the third-party approver 107 can approve the payment. In the example of divorced parents sharing the child's spending, the payor parent can approve the payment upon seeing a copy of the receipt. In the example of the landscape contractor, the payor 106 can approve the payment upon seeing a picture of the scene. Or, a third-party approver 107 (e.g., an inspector) can inspect the landscape service performed. If the payor 106 or the third-party approver 107 decides that the services/goods have been properly delivered and approves the payment, the funds can be transferred from the holding account to the payee's account. If the payor 106 or the third-party approver 107 decides that the services/goods have not been properly delivered, the funds or a portion of the funds can be transferred back from the holding account to the payor's account. For example, the contract between the payor and the landscaper (i.e., payee) may have stipulated that the landscaper use certain color mulch are certain areas of the payor's lawn. However, the image observed by the payor indicates a different color mulch and in different, non-stipulated areas. Nonetheless, the landscaper did still perform some work. Accordingly, the payor may release only a portion of the funds rather than the full agreed-upon amount.

At process 210, the payment processing circuit 116 of the pull payment server 114 fulfils a payment request from the payee 108 based on the established pull payment relationship. A specific process is discussed in detail below with reference to FIG. 3.

Figure 3:
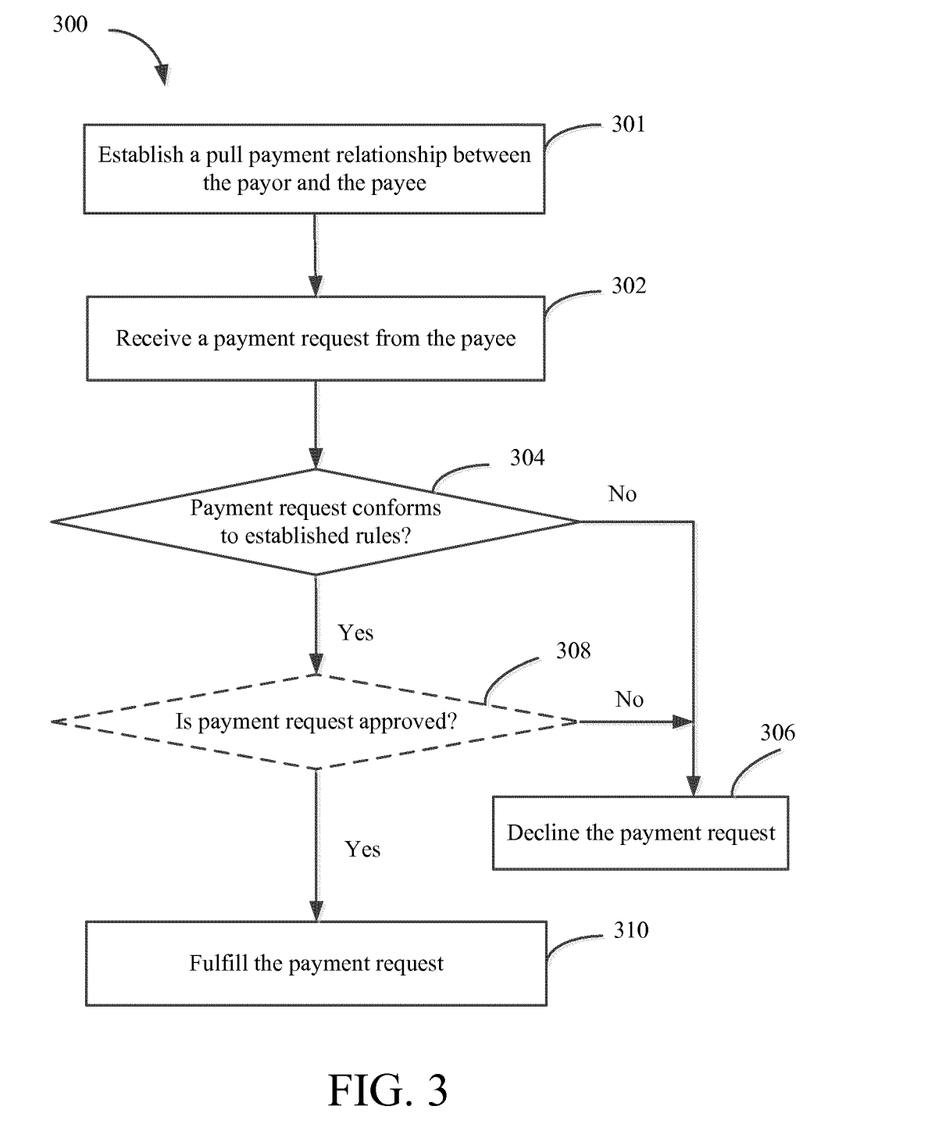
FIG. 3 is a flow diagram of a method of making a payment with an established pull payment relationship, according to an example embodiment.

Referring now to FIG. 3, a flow diagram of a method 300 of making a payment with an established pull payment relationship is shown according to an example embodiment. The method 300 can be performed by the financial institution computing system 110 (e.g., by the processor 111).

At process 301, a pull payment relationship is established between the payor 106 and the payee 108 based on rules. Both the payor 106 and the payee 108 can register with the financial institution computing system 110, which generates the transaction codes for the payor 106 and the payee 108. As discussed above, the payor 106 and the payee 108 can inform each other of the transaction codes through various processes in a contact or a near contact event. In some arrangements, the transaction code can be "tokenized" when being transmitted to the other party. Each token may be a string of characters (e.g., numbers, letters, symbols) such as email address, user identifier, device identifier, etc. that represents an encoded version of a transaction code. In some arrangements, the pull payment relationship may be established by "bumping" two devices associated with the payor and payee, respectively. For example, the user device 120 associated with the payor may include an infrared interface, an NFC interface, a Bluetooth network interface, a Wi-Fi interface, or another network interface. In other arrangements, a transaction code or token may be associated with a matrix barcode. The user device 120 and/or 130 may display the matrix barcode on the display. The other user device may scan the matrix barcode and obtain the transaction code or token. The financial institution computing system 110 establishes the pull payment relationship between the payor and the payee responsive to receiving the indication of such contact or near contact event. Furthermore, the payor 106 can define the rules regulating the pull payment relationship between the payor 106 and the payee 108, as discussed above.

At process 302, a payment request for pulling funds is received from the payee 108. Upon, for example, completing services and/or delivering goods to the payor 106, the payee 108 may request the financial institution 104 to pull funds from the payor's account and push the funds to the payee's account based on the established pull payment relationship. The request may include the payee's transaction code or token, the payor's transaction code or token, a requested amount, and a date for payment. For example, a sample request may be the following: to transfer a certain amount of funds from the account associated with the payor's transaction code or token to the account associated with the payee's transaction code or token by a certain date. In some arrangements, the request may further include information describing why the payment is being requested, such as for items sold, or services rendered. Such record keeping may be beneficial in order to track, sort, and otherwise manage pull payment fund transfers for the payor. In some arrangements, the request may further include identification information (e.g., name, phone number, email address) of the payor and/or the payee for confirmation/receipt. In some arrangements where multiple accounts are associated with the payee's transaction code, the request may specify which financial account should receive the payment or use priorities of the accounts as default.

Multiple channels are available to the payee 108 for requesting the payment, such as on-site, online, by mail, by phone, etc. For example, the payee 108 can visit a branch office of the financial institution 104 and submit the payment request to a teller who gets the payee's request into the financial institution computing system 110. In some arrangements, the payee 108 can fill a pull payment request form and send it to the financial institution 104 by mail; personnel of the financial institution 104 can get the payee's request into the financial institution computing system 110 based on information provided in the request form. In some arrangements, the payee 108 can talk to a call center personnel of the financial institution 104 and provide information needed to request payment. In some arrangements, the payee 108 can register through the pull payment client 136 on the user device 130. In some arrangements, the payee 108 can send a text message to the call center of the financial institution 104 requesting payment, and the personnel will get the information into the financial institution computing system 110. In some arrangements where the pull payment client 136 is a web browser, the payee 108 can request the payment on a webpage operated by the financial institution computing system 110 through the user device 130. In some arrangements where the pull payment client 136 is an application executed by the user device 130, the payee 108 can request the payment by running the application. It shall be understood that the payee 108 can submit the payment request to the financial institution 104 through any suitable channels.

In some arrangements, the payee 108 is requested to authenticate itself to the financial institution 104. For example, the payee may be requested to enter a password or provide a social security number (SSN) as part of the authentication process.

At process 304, the rules engine 115 on the financial institution computing system 110 determines whether the payment request conforms to the established rules. As discussed above, the rules can specify the amount, limit, time/date, and/or frequency of any payment made to the payee 108 by the payor 106. In some arrangements, the rules engine 115 can check whether the amount and date specified in the request conform to the amount and time/date provided in the rules. In some arrangements, the rules engine 115 makes the determination based on not only the amount/date specified the request, but also historical transactions relating to the pull payment relationship stored in the pull payment database 118. For example, the rules may specify that only one payment can be made every week. The rules engine 115 will check whether there was a payment made within a week before the requested date. Another example, the rules specify that a maximum of $500 can be made to the payee 108 during any three-month period. The rules engine 115 may check how much has been paid during the period and whether the addition of the requested payment will exceed the limit. It shall be understood that the rules engine 115 can check the payment request according to any suitable boundaries/conditions established for the payment relationship between the payor 106 and the payee 108.

If the request is determined to not conform to the established rules at the process 304, the request is declined at process 306. The financial institution 104 can notify the payee 108 of the declination of payment through multiple channels, such as phone call, text message, voice message, email, etc. In some arrangements, the pull payment server 114 on the financial institution computing system 104 can send the declination notification to the pull payment client 136 on the user device 130 via the network 102. The user device 130 can display the notification on the display 134 for the payee 108 to view.

If the request is determined to conform to the established rules regarding conditions and boundaries at process 304, the rules engine 115 may further determine whether the request is approved at process 308. As discussed above, the rules can specify whether an approval by the payor 106 or the third-party approver 107 is required before the payment is made. If the approval is not required, the method 300 will proceed to process 310 to settle the payment, which is discussed in detail below. If approval is required, the rules engine 115 will determine whether the payor 106 or the third-party approver 107 approves the payment.

In some arrangements where approval by the payor 106 is required, the financial institution 104 may pass the payment request to the payor 106 through phone call, text message, voice message, email, etc. In some arrangements, the pull payment server 114 may send the request to the pull payment client 126 on the user device 120 through the network 102. The user device 120 can display the request on the display 124 for the payor 106 to review. The payor 106 is provided with options such as "Approve," "Decline," or optionally, "Hold off." For example, the options are provided via a user interface of the pull payment client 126 for the payor 106 to select. If the payor 106 selects the option "Approve" to indicate that the payment request is approved, the method 300 will proceed to process 310 to settle the payment, which will be discussed in detail below. In some arrangements where multiple accounts are associated with the payor's transaction code, the approval may specify which financial account should be used to make the payment or use priorities of the accounts as default. If the payor 106 selects the option "Decline" to indicate that the request is declined, the method 300 will proceed to process 306 to decline the request, as discussed above.

In some arrangements, the payor 106 is provided with the option "Hold off" to indicate that the request is being held off for approval. As discussed above, a clawback mechanism can be created for situations where the payor 106 would like to check whether the payee 108 did deliver the services/products and/or the quality of the services/products before making the payment. If the payor 106 selects the option "Hold off," the financial institution computing system 110 can transfer the requested funds from the account associated with the payor's transaction code to the holding account operated by the financial institution 104. If the request is approved after the payor 106 inspects the products/services, the funds can then be transferred to the payee's account associated with the payee's transaction code. If the request is declined after the payor's inspection, the funds can then be transferred back to the payor's account. In some arrangements, the financial institution 104 may remind the payor 106 to decide on a payment being held off through multiple channels, such as phone call, voice message, text message, email, etc. For example, the pull payment server 114 can send the reminder of held-off to the pull payment client 126 for displaying on the display 124 for the payor 106 to view on a daily basis, a weekly basis, and so on.

In some arrangements where approval by the third-party approver 107 is required, the financial institution 104 may pass the payment request to the third-party approver 107 through a phone call, text message, voice message, email, etc. In some arrangements, the pull payment server 114 may send the request to a user device associated with the third-party approver 107 through the network 102. The third-party approver 107 is provided with options such as "Approve," "Decline," or optionally, "Hold off" to select. If the third-party approver 107 selects the option "Approve" to indicate that the payment request is approved, the method 300 will proceed to process 310 to settle the payment. If the third-party approver 107 selects the option "Decline" to indicate that the request is declined, the method 300 will proceed to process 306 to decline the request. In some arrangements, the financial institution 104 may pass the payment request to the third-party approver through multiple channels, such as phone call, voice message, text message, email, etc.

In some arrangements where a clawback mechanism is created as discussed above, the third-party approver 107 is provided with the option "Hold off" to indicate that the request is being held off for approval. If the third-party approver 107 selects the option "Hold off," the financial institution computing system 110 can transfer requested funds from the account associated with the payor's transaction code to the holding account operated by the financial institution 104. If the request is eventually approved by the third-party approver 107, the funds can then be transferred to the payee's account associated with the payee's transaction code. If the request is eventually declined by the third-party approver 107, the funds can then be transferred back to the payor's account. In some arrangements, the financial institution 104 may remind the third-party approver 107 to decide on a payment being held off through multiple channels, such as phone call, voice message, text message, email, etc. on a daily basis, a weekly basis, and so on.

If the rules engine 115 determines, at process 308, that the payment request is approved upon receiving the approval from the payor 106 or the third-party approver 107, the payment processing circuit 116 of the pull payment server 114 can fulfill the payment request at process 310. In particular, the payment processing circuit 116 may initiate an authorization of the requested amount on the payor's account associated with the payor's transaction code. In some arrangements, the authorization includes an amount of service fee for utilizing the pull payment services provided by the financial institution 104. The payment processing circuit 115 determines the issuer of the payor's account associated with the transaction code and requests a transfer of funds from the issuer through the payment network 109. As discussed above, the financial institution 104 and the issuer of the payor's account can be member banks of the payment network 109 and follow established protocols for transferring funds using the payment network 109. Thus, the financial institution 104 is capable of requesting funds directly from the issuer of the payor's account and providing payment authorization, clearing, and settlement services. If the transaction is declined or determined to be incomplete by the issuer, the processing payment circuit 116 may notify the payor 106 and payee 108 of the failure and abort the transaction. In some arrangements where multiple account are associated with the payor's transaction code, the payment processing circuit 116 may try other accounts following the hierarchy of priorities.

If the authorization is received from the issuer, the payment processing circuit 116 may initiate funds transfer from the payor's account to the payee's account. In particular, the payment processing circuit 116 can pull funds directly from the issuer of the payor's account and push the funds into the payee's account associated with the payee's transaction code through the payment network 109. The issuer of the payee's account can also be a member bank of the payment network 109 and follow established protocols for transferring funds using the payment network 109. Thus, the financial institution 104 is capable of pushing funds directly to the issuer of the payee's account and providing payment authorization, clearing, and settlement services. Due to the ability of the financial institution 104 to directly pull funds from the payor's account and push funds into the payee's account, the payor 106 and the payee 108 are not limited to using an account that is tied to the provider of the pull payment services. After the funds have been deposited into the payee's account, the financial institution 104 may notify the payor 106 and the payee 108 of the completion of transaction through multiple channels, such as phone call, voice message, text message, email, etc. For example, the pull payment server 114 can send the notification to the pull payment clients 126 and 136 on the user devices 120 and 130 associated with the payor 106 and the payee 108.

In some arrangements where the payment has been held off, the payment processing circuit 116 may pull funds from the payor's account and deposit the funds in the holding account upon receiving the "Hold off" option selected by the payor 106 or the third-party approver 107. If the "Approve" option is eventually selected by the payor 106 or the third-party approver 107, the payment processing circuit 116 can push the funds into the payee's account. In some arrangements, when the funds are transferred from the payor's account to the holding account, the financial institution 104 can notify the payor 106 and the payee 108 of the hold-off status through multiple channels, such as phone call, voice message, text message, email, etc. In further arrangements, when the funds are transferred from the holding account to the payee's account, the financial institution can send another message notifying the payor 106 and the payee 108 of the completion of the transaction through multiple channels. For example, the pull payment server 114 can send the notification(s) to the pull payment clients 126 and 136 on the user devices 120 and 130 associated with the payor 106 and the payee 108.

Technically, the systems, methods and apparatuses described herein may transform operation of a user device, such as a smartphone, to selectively utilize one or more network interfaces (e.g., infrared, NFC, Bluetooth, etc.) to establish a secure or relatively secure communication channel. Further, the user device may now serve as a repository or storage site for personal information of the user. In another arrangement, the personal information may be stored in the cloud. In either arrangement, the user may appreciate the flexibility provided by the systems herein to retain their personal and confidential information relatively securely.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A method comprising:
   registering, by a financial institution computing system, a payee for a pull payment service;
   generating, by the financial institution computing system, a transaction code associated with a plurality of accounts of the payee;

receiving, by the financial institution computing system, a priority value from the payee specifying a hierarchy of a plurality of accounts of the payee to define when each account in the plurality of accounts receives payments;

generating, by the financial institution computing system, a payee device token structured to identify a user device associated with the payee;

providing, by the financial institution computing system, the payee device token and the transaction code to the user device of the payee;

registering, by the financial institution computing system, a payor for the pull payment service;

receiving, by the financial institution computing system, an indication of a contact or a near-contact event between the user device associated with the payee and a user device associated with the payor;

receiving, by the financial institution computing system and from the user device associated with the payor, the transaction code associated with the payee and a transaction code associated with the payor, the transaction codes exchanged during the contact or near-contact event;

establishing, by the financial institution computing system, a pull payment relationship between the payee and the payor responsive to receiving the indication and the transaction codes from the user device associated with the payor;

storing, by the financial institution computing system in a pull payment database, the transaction code of the payee linked to the transaction code of the payor as part of the established pull payment relationship;

restricting, by the financial institution computing system, the established pull payment relationship between the payor and the payee to approving payment requests from only the user device associated with the payee device token;

establishing, by the financial institution computing system, rules governing the pull payment relationship between the payee and the payor, the rules defining a maximum frequency of payment requests from the payee, a maximum currency value for payment requests from the payee, and a requirement for an approval of payment requests from a third-party approver before fulfilling the payment requests;

receiving, by the financial institution computing system, a payment request having a requested currency value;

determining, by the financial institution computing system, that the received payment request conforms to the established rules, that the payment request originated from the user device identified by the payee device token, and that the received transaction codes contained in the payment request match the stored transaction codes of the payee and the payor contained in the pull payment database; and processing, by the financial institution computing system, the received payment request in response to the determination that the payment request conforms to the established rules, wherein the processing comprises transferring funds from an account of the payor to an account of the payee based on the hierarchy of the plurality accounts of the payee indicated by the priority value.

2. The method of claim 1, wherein the contact or the near-contact event is a near field communication (NFC).

3. The method of claim 1, wherein the transaction code of the payee and the transaction code of the payor are tokenized.

4. The method of claim 1, further comprising:

receiving, by the financial institution computing system, a subsequent payment request from the payee requesting the payment from the payor;

determining, by the financial institution computing system, whether the subsequent payment request conforms to the established rules governing the pull payment relationship; and one of:
　declining, by the financial institution computing system, the subsequent payment request in response to determining that the subsequent payment request does not conform to the established rules; or
　fulfilling, by the financial institution computing system, the subsequent payment request in response to determining that the subsequent payment request conforms to the established rules.

5. The method of claim 1, wherein the rules further define a time or a date.

6. The method of claim 1, further comprising:

determining, by the financial institution computing system, that approval of the received payment request is postponed by the third-party approver;

transferring, by the financial institution computing system, funds from a second financial account to a holding account at the financial institution computing system in response to the determination that approval of the received payment request is postponed by the third-party approver;

transferring, by the financial institution computing system, the funds from the holding account to a first financial account upon receiving the approval by the third-party approver; and transferring, by the financial institution computing system, the funds back from the holding account to the second financial account upon receiving a declination by the-third-party approver.

7. A computing system associated with a financial institution, the computing system comprising:

a pull payment repository structured to store information relating to a pull payment service provided by the financial institution; and a processor communicably coupled to the pull payment repository and structured to:
　register a payee for the pull payment service;
　generate a transaction code associated with a plurality of accounts of the payee;
　receive a priority value from the payee specifying a hierarchy of a plurality of accounts of the payee to define when each account in the plurality of accounts receives payments;
　generate a payee device token structured to identify a user device associated with the payee;
　provide the payee device token and the transaction code to the user device of the payee;
　register a payor for the pull payment service;
　receive an indication of a contact or a near-contact event occurring between the user device associated with the payee and a user device associated with the payor;
　receive, from the user device associated with the payor, the transaction code associated with the payee and a transaction code associated with the payor, the transaction codes exchanged during the contact or near-contact event;

establish a pull payment relationship between the payee and the payor responsive to receiving the indication and the transaction codes from the user device associated with the payor;

store, in a pull payment database, the transaction code of the payee linked to the transaction code of the payor as part of the established pull payment relationship;

restrict the established pull payment relationship between the payor and the payee to approving payment requests from only the user device associated with the payee device token;

establish rules governing the pull payment relationship between the payee and the payor, the rules defining a maximum frequency of payment requests from the payee, a maximum currency value for payment requests from the payee, and a requirement for an approval of payment requests from a third-party approver before fulfilling the payment requests;

receive a payment request having a requested currency value;

determine that the received payment request conforms to the established rules, that the payment request originated from the user device identified by the payee device token, and that the received transaction codes contained in the payment request match the stored transaction codes of the payee and the payor contained in the pull payment database; and process the received payment request in response to the determination that the payment request conforms to the established rules, wherein the processing comprises transferring funds from an account of the payor to an account of the payee based on the hierarchy of the plurality accounts of the payee indicated by the priority value.

8. The computing system of claim 7, wherein the contact or the near-contact event is a near field communication (NFC).

9. The computing system of claim 7, wherein the processor is further configured to:
receive a subsequent payment request from the payee requesting the payment from the payor;
determine whether the subsequent payment request conforms to the established rules governing the pull payment relationship; and
one of:
decline the subsequent payment request in response to determining that the subsequent payment request does not conform to the established rules; or
fulfill the subsequent payment request in response to determining that the subsequent payment request conforms to the established rules.

10. The computing system of claim 7, wherein the processor is further configured to:
determine that approval of the received payment request is postponed by the third-party approver;
transfer funds from a second financial account to a holding account at the financial institution in response to a determination that approval of the received payment request is postponed by the third-party approver;
transfer the funds from the holding account to a first financial account upon receiving the approval by the third-party approver; and
transfer the funds back from the holding account to the second financial account upon receiving a declination by the third-party approver.

11. A non-transitory computer-readable media having computer-executable instructions embodied therein, when executed by a processor of a financial institution computing system, cause the financial institution computing system to perform a process, the process including:
registering a payee for a pull payment service;
generating a transaction code associated with a plurality of accounts of the payee;
receiving a priority value from the payee specifying a hierarchy of a plurality of accounts of the payee to define when each account in the plurality of accounts receives payments;
generating a payee device token structured to identify a user device associated with the payee;
providing the payee device token and the transaction code to the user device of the payee;
registering a payor for the pull payment service;
receiving an indication of a contact or a near-contact event occurring between the user device associated with the payee and a user device associated with the payor;
receiving, from the user device associated with the payor, the transaction code associated with the payee and a transaction code associated with the payor, the transaction codes exchanged during the contact or near-contact event;
establishing a pull payment relationship between the payee and the payor responsive to receiving the indication and the transaction codes from the user device associated with the payor;
storing, in a pull payment database, the transaction code of the payee linked to the transaction code of the payor as part of the established pull payment relationship;
restricting the established pull payment relationship between the payor and the payee to approving payment requests from only the user device associated with the payee device token;
establishing rules governing the pull payment relationship between the payee and the payor, the rules defining a maximum frequency of payment requests from the payee, a maximum currency value for payment requests from the payee, and a requirement for an approval from a third-party approver of payment requests from the payee before fulfilling the payment requests;
receiving a payment request having a requested currency value;
determining that the received payment request conforms to the established rules, that the payment request originated from the user device identified by the payee device token, and that the received transaction codes contained in the payment request match the stored transaction codes of the payee and the payor contained in the pull payment database; and
processing the received payment request in response to the determination that the payment request conforms to the established rules, wherein the processing comprises transferring funds from an account of the payor to an account of the payee based on the hierarchy of the plurality accounts of the payee indicated by the priority value.

12. The media of claim 11, wherein the contact or the near: contact event is a near field communication (NFC).

13. The media of claim 11, wherein the process further includes:
receiving a subsequent payment request from the payee requesting the payment from the payor;

determining whether the subsequent payment request conforms to the established rules governing the pull payment relationship; and one of:

declining the subsequent payment request in response to determining that the subsequent payment request does not conform to the established rules; or fulfilling the subsequent payment request in response to determining that the subsequent payment request conforms to the established rules.

14. The media of claim 11, wherein the rules further define a time or a date.

15. The media of claim 11, wherein the process further includes:

determining that approval of the received payment request is postponed by the third-party approver;

transferring funds from a second financial account to a holding account at the financial institution computing system in response to the determination that approval of the received payment request is postponed by the third-party approver;

transferring the funds from the holding account to a first financial account upon receiving the approval by the third-party approver; and transferring the funds back from the holding account to the second financial account upon receiving a declination by the third-party approver.

\* \* \* \* \*